(12) United States Patent
Downs

(10) Patent No.: US 8,449,203 B2
(45) Date of Patent: May 28, 2013

(54) COOLING METHOD FOR CXP ACTIVE OPTICAL TRANSCEIVERS

(75) Inventor: Thomas John Downs, Hinsdale, IL (US)

(73) Assignee: Tellabs Operations, Inc., Naperville, IL (US)

( * ) Notice: Subject to any disclaimer, the term of this patent is extended or adjusted under 35 U.S.C. 154(b) by 400 days.

(21) Appl. No.: 12/807,364

(22) Filed: Sep. 2, 2010

(65) Prior Publication Data

US 2011/0317964 A1 Dec. 29, 2011

Related U.S. Application Data

(60) Provisional application No. 61/357,776, filed on Jun. 23, 2010.

(51) Int. Cl.
*G02B 6/36* (2006.01)
*H05K 7/20* (2006.01)

(52) U.S. Cl.
USPC .............. 385/92; 361/707; 361/709; 361/715

(58) Field of Classification Search
USPC .................... 385/92; 361/704, 707, 709, 715, 361/716
See application file for complete search history.

(56) References Cited

U.S. PATENT DOCUMENTS

| | | | |
|---|---|---|---|
| 6,443,768 | B1 | 9/2002 | Dirkers et al. |
| 6,881,095 | B2 | 4/2005 | Murr et al. |
| 7,001,217 | B2 * | 2/2006 | Bright et al. ............... 439/607.2 |
| 7,239,515 | B2 * | 7/2007 | Bulman-Fleming et al. . 361/704 |
| 7,357,673 | B2 | 4/2008 | Long |
| 7,764,504 | B2 * | 7/2010 | Phillips et al. ................ 361/715 |
| 7,898,808 | B2 * | 3/2011 | Joiner et al. ................... 361/707 |
| 2009/0025909 | A1 * | 1/2009 | Huang .................... 165/104.26 |

OTHER PUBLICATIONS http://www.molex.com/pdm_docs/sd/1704650002_sd.pdf, downloaded from the World Wide Web on Jul. 8, 2011.
http://www.molex.com/pdm_docs/sd/761050584_sd.pdf, downloaded from the World Wide Web on Jul. 8, 2011.
http://www.molex.com/pdm_docs/sd/761050184_sd.pdf, downloaded from the World Wide Web on Jul. 8, 2011.
http://www. molex.com/molex/common/staticLoader. jsp?fileName=/mx_upload/editorial/818/ipass_hsc_cxp.html &channel=News+In+Brief&channelId=-8, downloaded from the World Wide Web on Jul. 8, 2011.
http://www.molex.com/molex/common/staticLoader. jsp;jsessionid=9ABB105876F8945FDA60173F57736823. node0?fileName=/cmc_upload/0/000/447/189/cxp_pr.html &channel=News+In+Brief&channelId=-8&progLink=null, Downloaded from the World Wide Web on Jul. 8, 2011.

* cited by examiner

*Primary Examiner* — Hemang Sanghavi
(74) *Attorney, Agent, or Firm* — Hamilton, Brook, Smith & Reynolds, P.C.

(57) ABSTRACT

CXP is a telecommunications connector standard based on cage assemblies originally designed for copper cables. Optical transceivers dissipate more heat than copper cables, however, so cage assemblies designed for copper cables cannot remove heat adequately for proper transceiver operation. One embodiment of the inventive cage assemblies removes heat from an optical transceiver with a heat spreader, which protrudes through an aperture in a cage, and a compressible gap pad in thermal contact with the heat spreader. Inserting the optical transceiver into the cage places the transceiver in thermal contact with a heat spreader and pushes the heat spreader out of the cage, which, in turn, causes the gap pad to come into thermal contact with a heat pipe and/or a heat sink. The embodiment provide a low mechanical profile to support high-density circuit board configurations for high-density optical connectivity systems, such as used in Dense Wavelength Division optical networking.

33 Claims, 7 Drawing Sheets

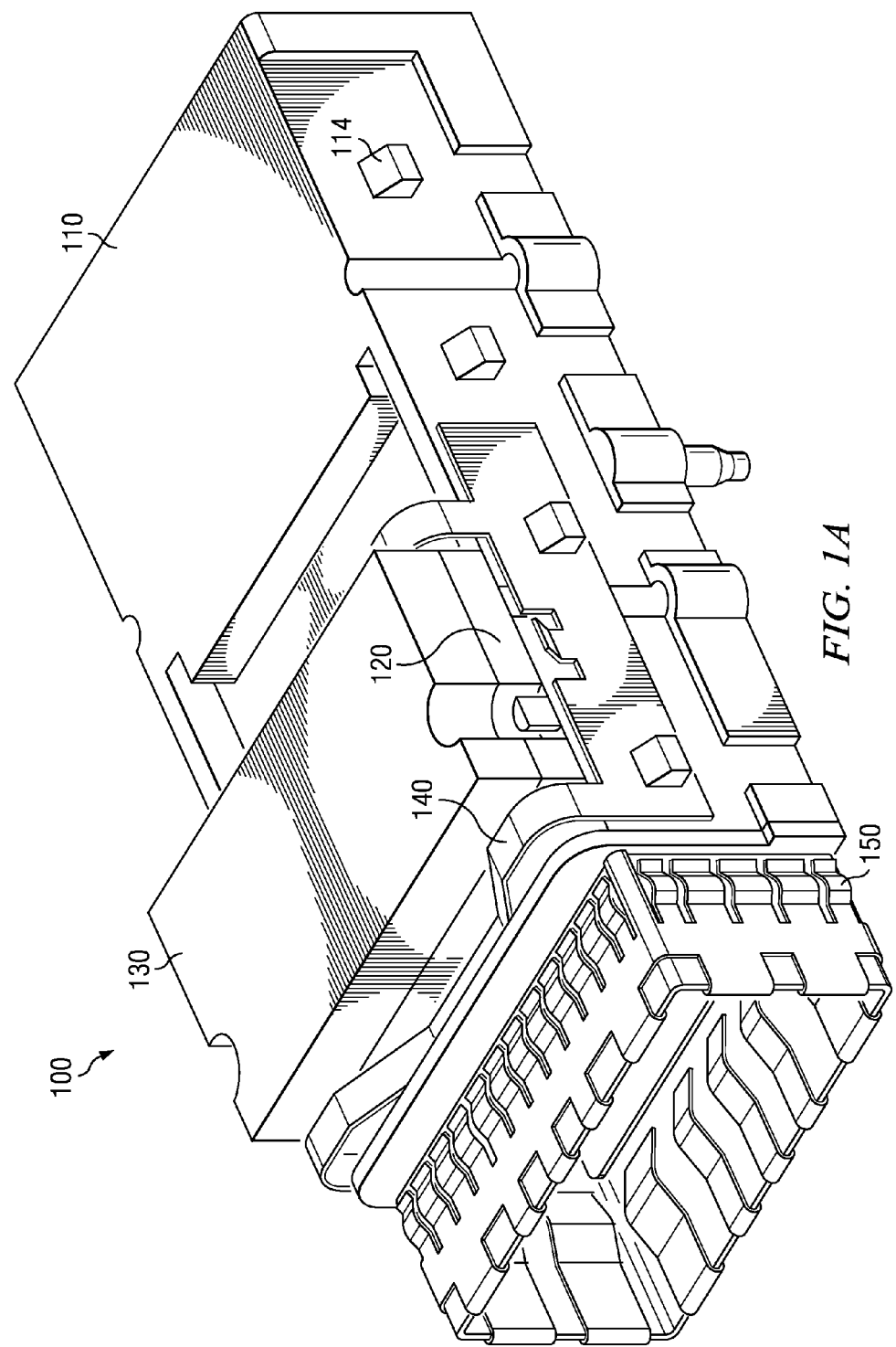

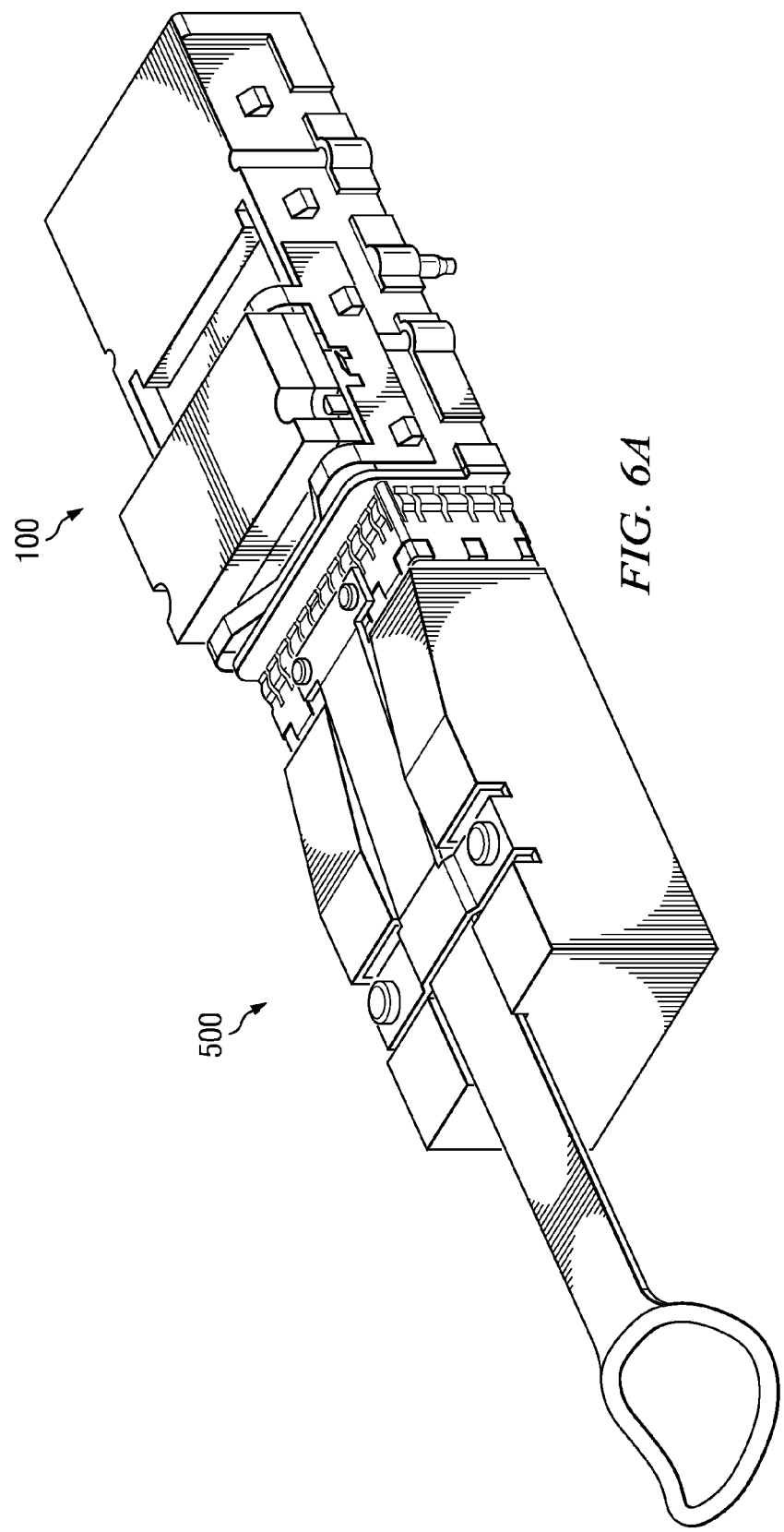

COOLING METHOD FOR CXP ACTIVE OPTICAL TRANSCEIVERS

RELATED APPLICATION

This application claims the benefit of U.S. Provisional Application No. 61/357,776, filed on Jun. 23, 2010.

The entire teachings of the above application are incorporated herein by reference.

BACKGROUND

CXP is standard for connector systems for optical fiber communications. Typical CXP-compliant cage assemblies, such as the Molex® iPass+™ integrated cage assembly, are based on cage assemblies originally designed for copper cables rather than optical fiber cables. Unfortunately, cage assemblies designed for copper cables cannot adequately remove the heat generated by optical transceivers, which tend to generate more heat than transceivers for copper cables. Adding heat sinks to the cage assemblies would make the cage assemblies too thick to use in rack-mounted optical modules, which are limited to specified heights by industry standards. Moreover, even if size restrictions did not prevent mounting of heat sinks directly to the cage assemblies, the thermal resistance between the heatsink and air is too high to cool the CXP in high-density front-panel applications.

SUMMARY

Embodiments of the present invention include a cage assembly and corresponding method for removing heat from an operating optical transceiver, such as a CXP-compliant transceiver. Example apparatus include a cage, a heat spreader that projects at least partially through an aperture in the cage, and a compressible gap pad in thermal contact with the heat spreader. The cage secures the optical transceiver in an inserted state; in the inserted state, a conduction surface of the heat spreader is in thermal contact with the optical transceiver. The gap pad, which is compressed in the inserted state, conducts heat away from the optical transceiver during operation of the optical transceiver, which may be connected to a circuit board and/or one or more optical fibers.

Some embodiments may include a spring clip that secures the heat spreader to the cage in a first flexible manner in an axis perpendicular to the aperture in the cage and in a second flexible manner in an axis parallel to the cage. The first flexible manner is more flexible than the second flexible manner, and may be up to or including rigid. The spring clip may also include one or more arms that project at least partially through the aperture in the cage.

The heat spreader, which can be made of aluminum, may also include an angled facet or curved portion that projects at least partially through the aperture in the cage. The angled facet or curved portion contacts a leading edge or corner of the optical transceiver during insertion of the optical transceiver into the cage. Example angled facets or curved portions may be contiguous with the conduction surface, which may be at least partially coated with a non-stick coating, such as nickel plating. The non-stick coating reduces the frictional force exerted during insertion by the angled facet and conduction surface on the transceiver. As a result, the force needed to insert the optical transceiver into the cage is within a range of about 4 lbf to about 15 lbf, which is small enough to enable insertion by hand. The insertion force may be increased or decreased by various increments, such as ±0.5 lbf, depending on the application and whether insertion tools are employed.

The compressible gap pad is arranged to be compressed upon insertion of the optical transceiver into the cage, and can be further configured to expand upon removal of the optical transceiver from the cage. The compressible gap pad remains compressed in the inserted state, and may be made of, for example, Laird HR 1200, Bergquist 3000S30, Bergquist 5000S35, thermally conductive tape, phase change material, or other materials with similar characteristics. The compressible gap pad can be bonded to the heat spreader with an adhesive.

Example apparatus may also include a finger stock coupled to the cage and configured to reduced electromagnetic interference (EMI). The finger stock can be made of Beryllium Copper, which is a copper alloy, or any other suitable, electrically conductive material. Beryllium copper is preferred because it is soft compared to other metals.

Other embodiments of the present invention include an optical module, such as a router or a switch, that includes one or more cage assemblies, each of which includes a cage that can secure a respective CXP-compliant optical transceiver in an inserted state. Each cage assembly also includes a thermally conductive gap pad that is compressed while the optical transceiver is secured within the cage. Removing the optical transceiver from the cage allows the gap pad to re-expand. Each cage assembly may also include a heat spreader and a spring clip as described above. The compressed gap pad may be in thermal contact with a heat pipe spanning from the cage to a heat sink disposed along an edge of the optical module. Alternatively, the compressed gap pad may be coupled to a heat dispersive element configured to support similar heat removal and dispersion properties. The heat sink removes heat, conducted by the heat pipe via the gap pad, from the optical transceiver secured within the cage.

Embodiments of the present inventive cage assemblies and optical modules can remove more heat from optical transceivers than other cage assemblies and optical modules. In addition, the cage assemblies can be mounted at an angle with respect to the circuit boards in the optical modules, increasing the maximum usable area of the circuit boards and reducing the bend angle or radius of optical fiber coupled to the cage assemblies.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-1C are perspective, side, and cross-sectional views, respectively, of a cage assembly with a heat spreader and compressible gap pad.

FIGS. 6A-6C are perspective, side, and cross-sectional views, respectively, of the optical transceiver of FIG. 5 inserted into the cage assembly of FIGS. 1A-1C.

DETAILED DESCRIPTION OF PREFERRED EMBODIMENTS

A description of example embodiments of the invention follows.

Figure 1B:
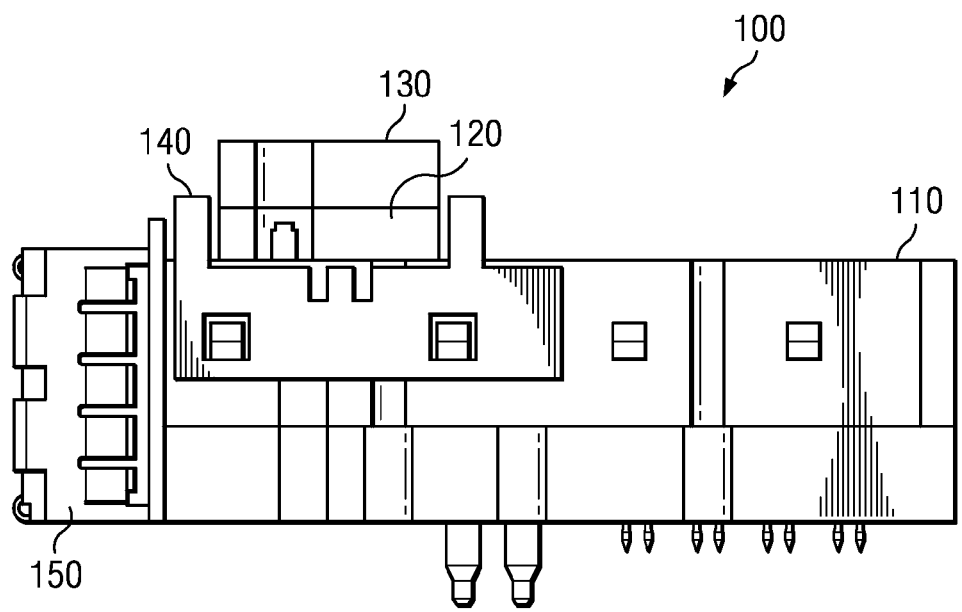
Figure 1C:
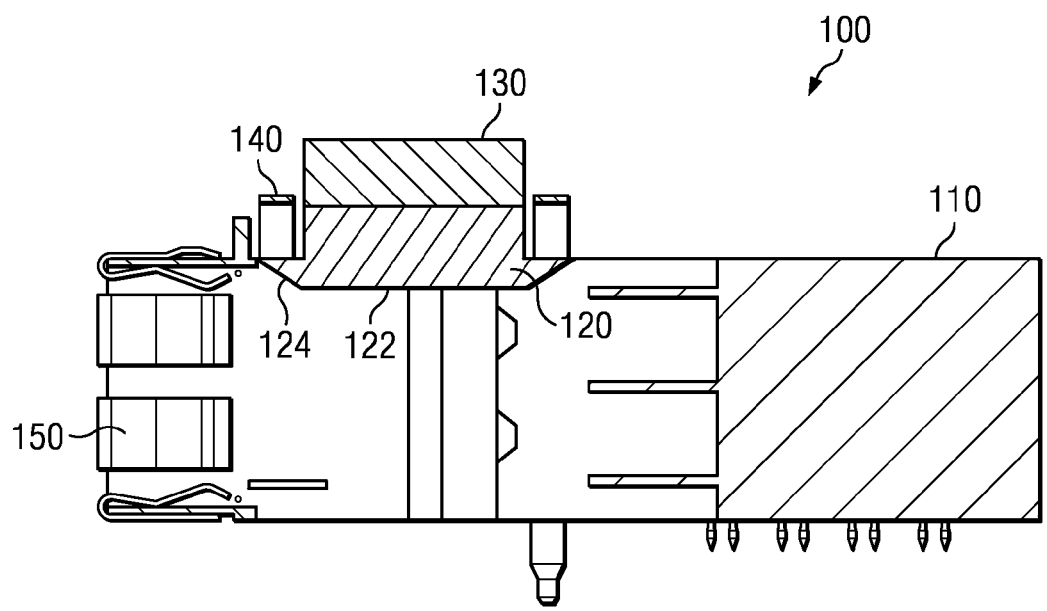
Figure 5:
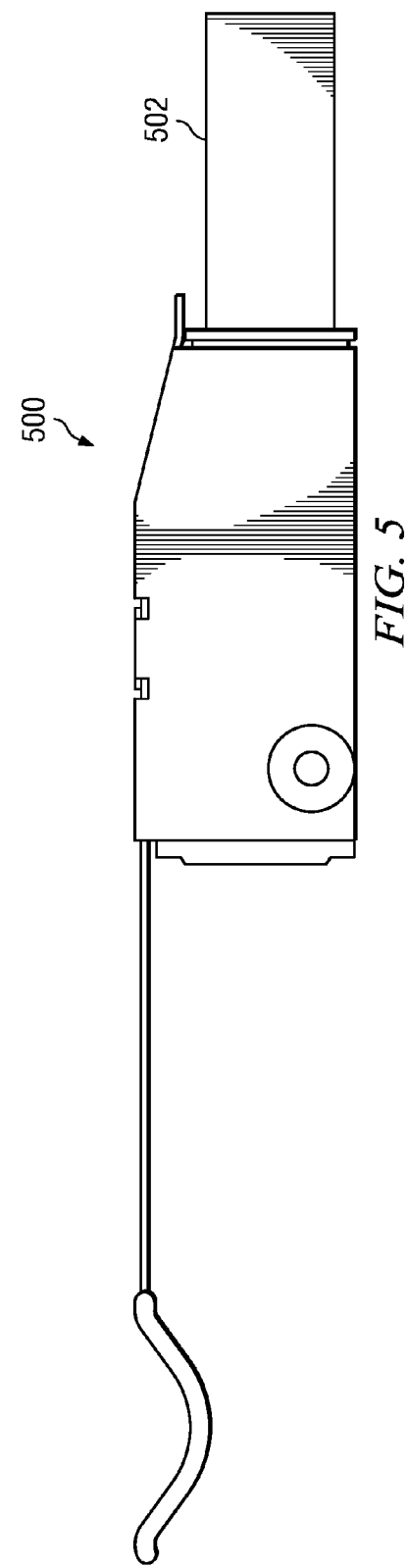
FIG. 5 is a side view of a CXP optical transceiver.

FIGS. 1A-1C show a cage assembly 100 suitable for securing and removing heat from an operating CXP-compliant optical transceiver, such as the transceiver 500 shown in FIG. 5. The cage assembly 100 includes a compressible gap pad 130 disposed over a heat spreader 120, which is secured to a cage 110 with a spring clip 140 that attaches to one or more latch points 114 on the outside of the cage 110. The spring clip 140 can be flexed in elastic fashion for attachment to and removal from the cage 110, but is stiff enough to stay secured to the cage 110 under normal operating conditions.

Figure 2:
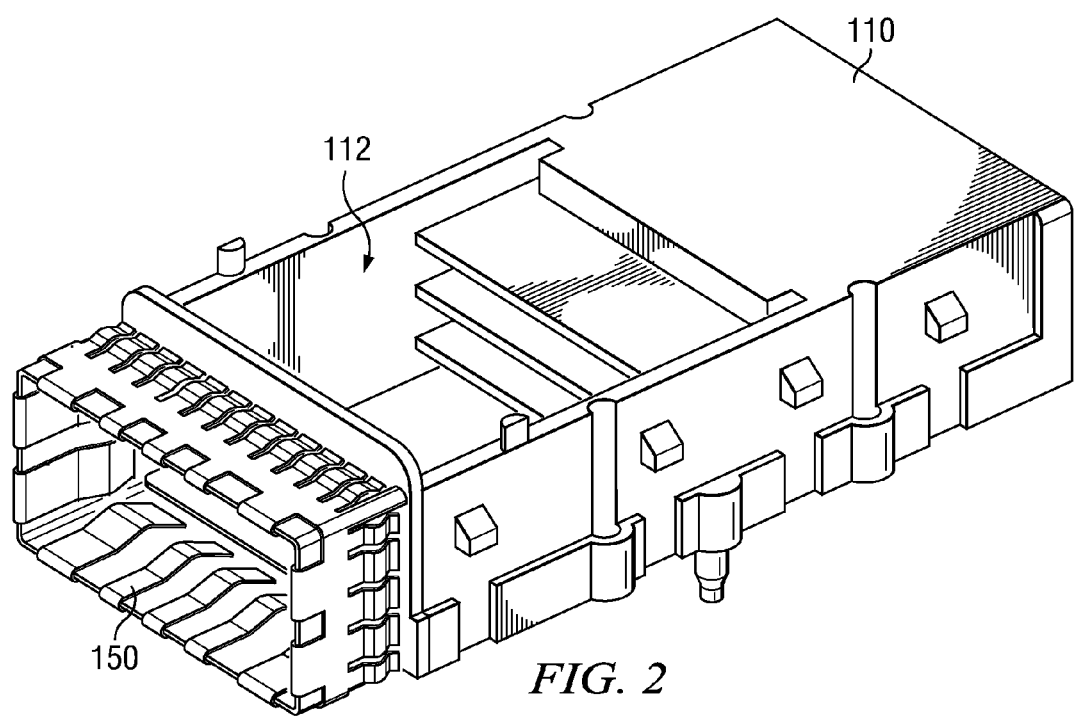
FIG. 2 is a perspective view of a cage with a finger stock.
Figure 3:
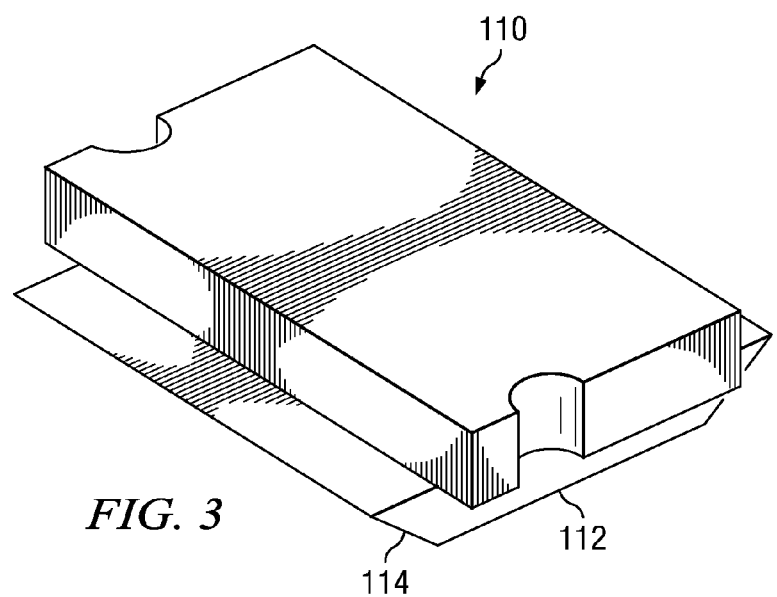
FIG. 3 is a perspective view of a heat spreader with an angled facet.
Figure 4:
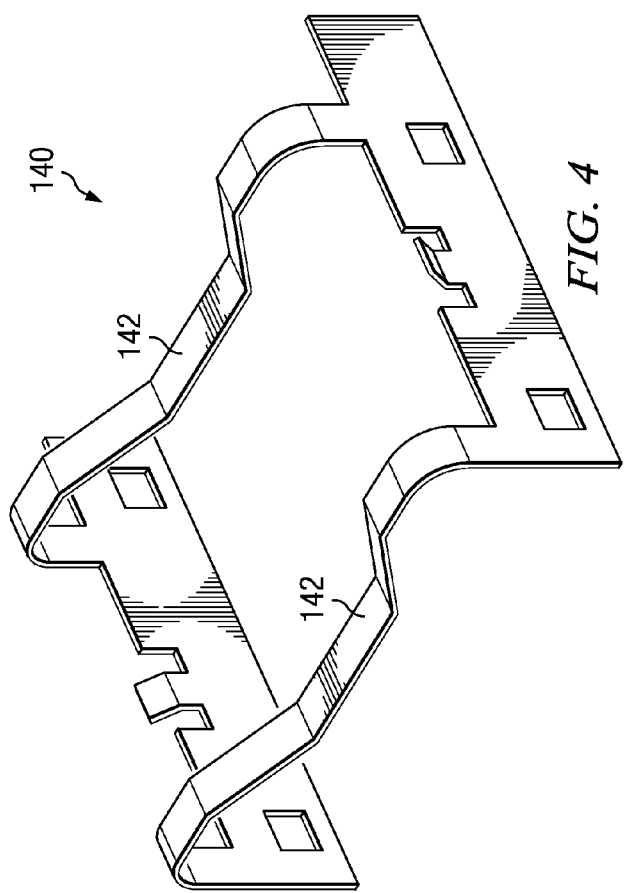
FIG. 4 is a perspective view of a spring clip suitable for securing the heat spreader of FIG. 3 to the cage of FIG. 2 such that a portion of the heat spreader projects through an aperture in the cage.

The spring clip 140 suspends (i.e., maintains the position of) the heat spreader 120 above or partially within an aperture 112 in the cage 110. (FIG. 2 shows a clear view of the unobstructed aperture 112.) As shown in FIGS. 1A and 4, the spring clip 140 includes two arms 142 that hold the heat spreader 120 in place. The arms 142 run perpendicular to the insertion axis of the cage 110 and are angled slightly to project partway into the aperture 112. The spring clip 140 can be made of spring steel, beryllium copper, or any other suitable material.

The heat spreader 120, which may be made of aluminum or other thermally conductive material, including combinations of solids and fluids, also projects at least partway into the aperture 112, as shown in the cross-sectional view of FIG. 1C. More specifically, a conduction surface 122 on the bottom of the heat spreader 120 fits through the aperture 112, as does a beveled surface, also known as an angled facet 124, contiguous with the conduction surface 122 on the lower side of the heat spreader 120. The angled facet 124 is graded at an angle within a range of about 10 degrees to about 30 degrees, or, more preferably, at an angle of about 20 degrees. The facet 124 can also be curved or smoothly blended with the conduction surface 122. Both the facet 124 and the conduction surface 122 can be coated with a non-stick coating, such as electroless nickel plating.

The gap pad 130 is in thermal contact with the heat spreader 120, and may be bonded to an upper surface of the heat spreader 120 with an adhesive (not shown). The gap pad 130 may be made of Laird HR 1200, Bergquist 3000S30, Bergquist 5000S35, thermally conductive tape, phase change material, or any other material with suitable resiliency and thermal characteristics. The gap pad 130 compresses readily and expands to (or close to) its original size upon removal of compressive force.

Figure 6B:
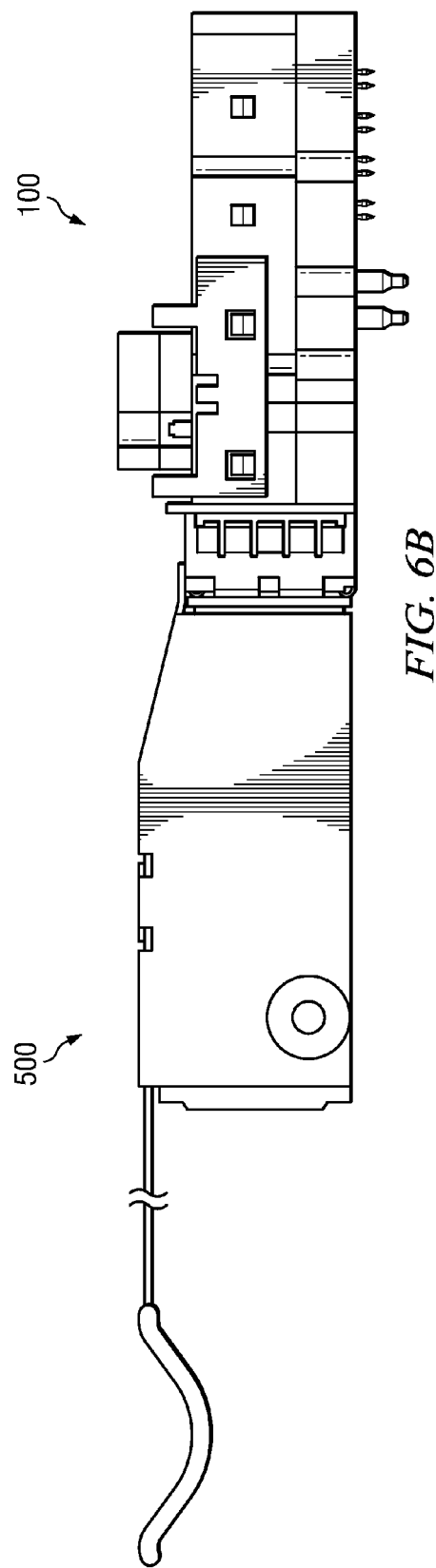
Figure 6C:
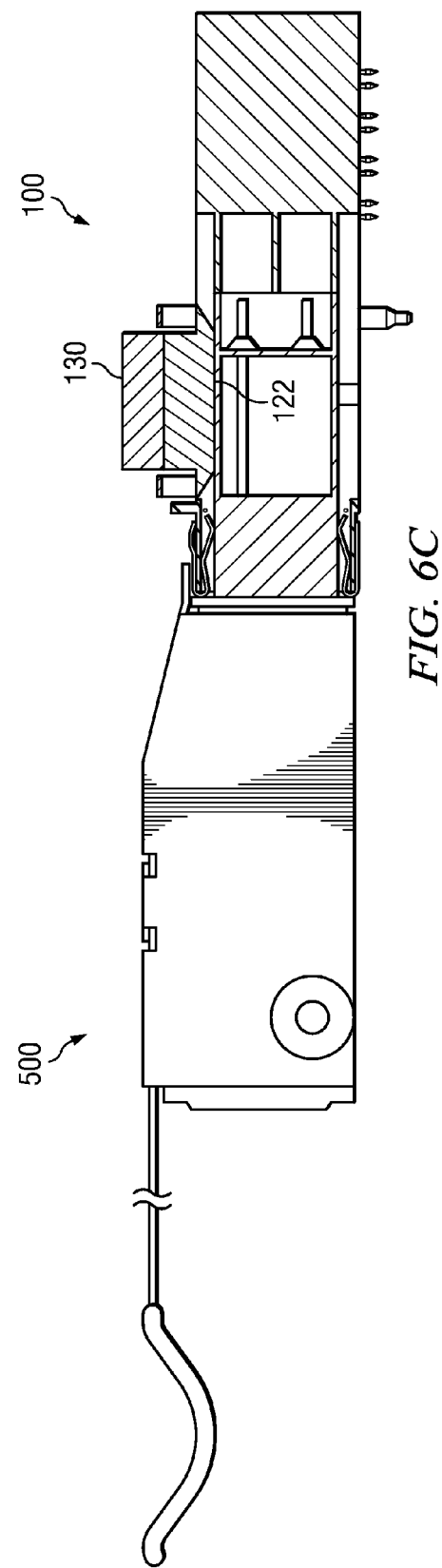

FIGS. 6A-6C show perspective, side, and cross-sectional views of a CXP optical transceiver 500 (shown in FIG. 5) inserted into the cage assembly 100 shown in FIGS. 1A-1C. Pushing the CXP optical transceiver 500 into the cage 110 causes a corner 502 of the transceiver 500 to contact the angled facet 124 of the heat spreader 120. As the transceiver 500 moves farther into the cage 110, the transceiver corner 502 slides along the angled facet 124, forcing the heat spreader 120 up through the aperture 112 and flexing the spring clip arms 142. When fully inserted, the transceiver 500 is in thermal contact with the conduction surface 122 of the heat spreader 120, which is pushed against the inserted transceiver 500 by the flexed spring clip arms 142.

The lower surface of the heat spreader 120, including the conduction surface 122 and the angled facet 124, may be coated with a non-stick coating, such as nickel plating, to reduce the frictional force exerted by the lower surface of the heat spreader 120 on the transceiver 500 as the transceiver 500 is inserted into the cage 110. Preferably, the force required to insert the transceiver 500 into the cage 110 is within a range of about 4 lbf to about 15 lbf, which is enough to ensure that the transceiver 500 may be properly secured by hand. Increasing the required insertion force above 15 lbf may make it too difficult to insert the transceiver 500 into the cage 110 by hand.

As the heat spreader 120 moves out of the cavity occupied by the inserted transceiver 500, it raises the gap pad 130 towards a piece of sheet metal (not shown). The heat spreader 120 compresses the gap pad 130 against the sheet metal, creating a thermal conduction pathway from the transceiver 500 to the sheet metal via the conduction surface 122, the heat spreader 120, and the compressed gap pad 130. Each conduction pathway can remove up to about 3.5 Watts, which is the amount of heat generated by an operating CXP transceiver.

Figure 7:
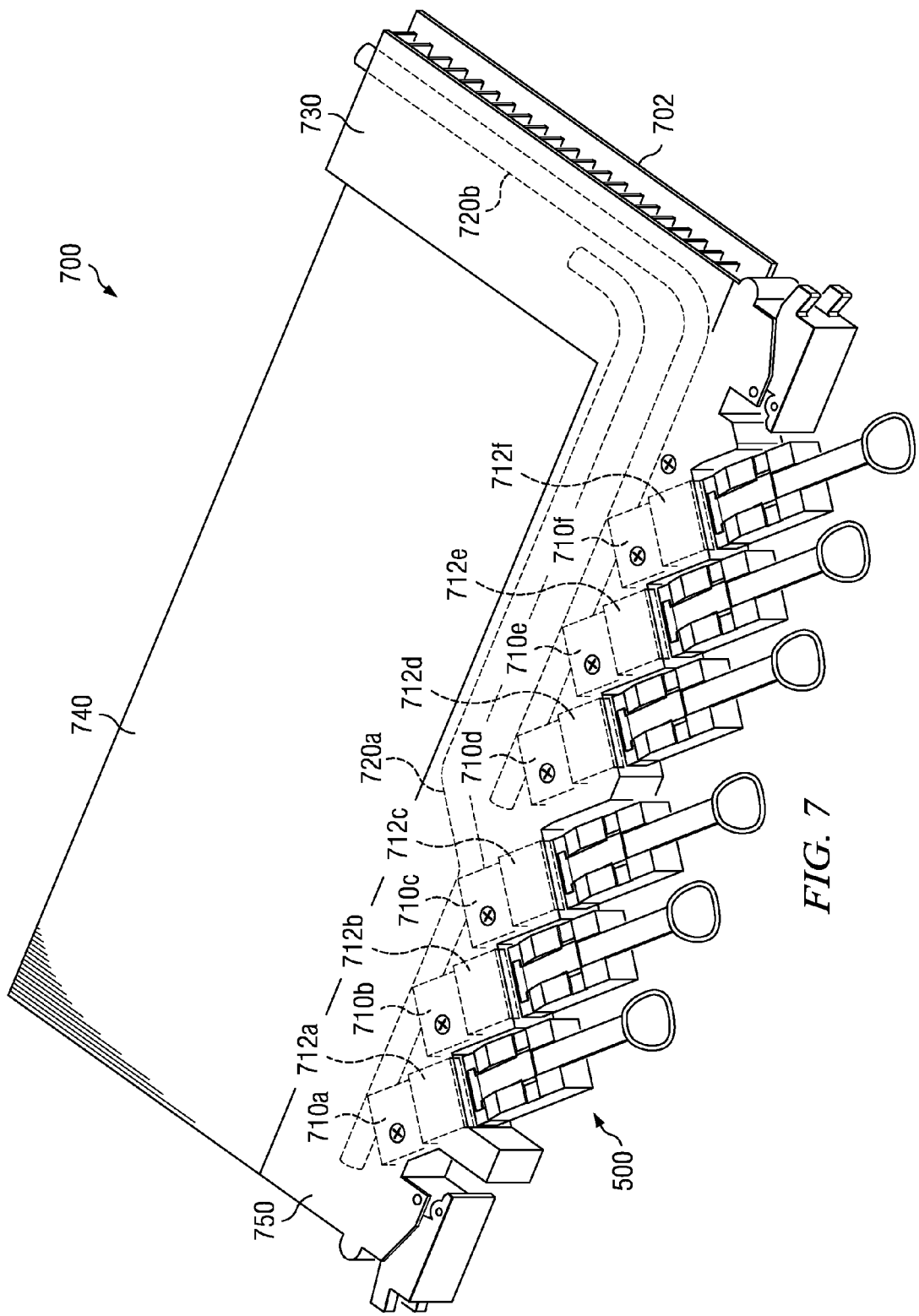
FIG. 7 is a perspective cut-away view of an optical module with optical transceivers inserted into cage assemblies along one side of the optical module.

FIG. 7 shows an optical module 700 with a circuit board 740 connected to six cage assemblies, each of which includes a respective cage 710a-710f and a respective compressible gap pad 712a-712f. Each cage assembly may also include a heat spreader and a spring clip, as described above with respect to FIGS. 1A-1C and 6A-6C. Although the optical module 700 includes eight cage assemblies, other optical modules within the scope of the invention may include a larger or smaller number of cage assemblies. For example, other modules may include sixteen cage assemblies for securing and removing heat from optical transceivers.

The optical transceivers 500 inserted into the cages 710a-710f push the gap pads 712 against a piece of sheet metal 750, compressing the gap pads 712a-712f. Each compressed gap pad 712a-712f forms a conduction pathway between an inserted optical transceiver 500 and one of two heat pipes 720a and 720b soldered to the sheet metal. The heat pipes 720a and 720b conduct the heat generated by the transceivers 500 to a heat sink 730 that is disposed along an edge 702 of the module 700 and that transfers the heat to air or another fluid passing along the module edge 702. For example, the heat pipes 720a and 720b may transfer heat from the gap pads 712a-712f to the heat sink 730 with fluid, such as water, contained within the heat pipes 720a and 720b. The fluid evaporates as it comes in thermal contact with the compressed gap pads 712a-712f, and the evaporated fluid flows toward the heat sink 730. Upon reaching the heat sink 730, the evaporated fluid condenses; the condensed fluid moves along a wick or filament in each heat pipe 720a and 720b back toward the gap pads 712a-712f via capillary action.

Compared to other modules, the module 700 shown in FIG. 7 provides cooling for multiple CXP optical transceivers 500 on a telecommunications blade with a front panel width as small as 0.95 inches, and, in some cases, even smaller than 0.95 inches. In addition, the separation between the heat pipes 720a and 720b and the transceivers 500 allows the cages 710a-710f to be placed at a very large angle, e.g., about 45 degrees, with respect to the module edges. This large mounting angle creates space on the circuit board 740 for other components and reduces the bend angle of fiber (not shown) connected to the cages 710a-710f.

While this invention has been particularly shown and described with references to example embodiments thereof, it will be understood by those skilled in the art that various changes in form and details may be made therein without departing from the scope of the invention encompassed by the appended claims.

What is claimed is:

1. An optical module comprising:
   a cage configured to secure an optical transceiver inserted therein, the cage including a thermally conductive gap pad configured to be compressed during an insertion state of the optical transceiver in the cage;
   a heat pipe configured to contact a surface of the gap pad during a compressed state of the gap pad; and
   a heat sink configured to remove heat, conducted by the heat pipe via the gap pad, from the cage.

2. The optical module of claim 1, wherein the gap pad is further configured to expand upon removal of the optical transceiver from the cage.

3. The optical module of claim 1, wherein the heat sink is disposed along an edge of the optical module, and wherein the heat pipe spans from the gap pad to the edge of the optical module.

4. The optical module of claim 1, wherein the cage further includes a heat spreader in thermal contact with the gap pad, the heat spreader having a conduction surface configured to be in thermal contact with a surface of the optical transceiver during an inserted state of the optical transceiver into the cage.

5. The optical module of claim 4, wherein the heat spreader includes an angled facet or curved portion that projects at least partially through an aperture in the cage, the angled facet or curved portion configured to contact a leading edge of the optical transceiver during insertion of the optical transceiver into the cage to position the heat spreader in thermal contact with the optical transceiver.

6. The optical module of claim 4, further including:
   a spring clip that secures the heat spreader to the cage in a first flexible manner in an axis perpendicular to the aperture in the cage and in a second flexible manner in an axis parallel to the cage, the first flexible manner being more flexible than the second flexible manner, being up to or including rigid.

7. The optical module of claim 6, wherein the spring clip projects at least partially through the aperture in the cage.

8. The optical module of claim 4, wherein the heat spreader includes aluminum.

9. The optical module of claim 4, wherein the conduction surface is at least partially coated with a non-stick coating.

10. The optical module of claim 9, wherein the non-stick coating includes nickel plating.

11. The optical module of claim 4, wherein the heat spreader is bonded to the compressible gap pad with an adhesive.

12. The optical module of claim 1, further including:
    a circuit board for processing, routing, or amplifying optical signals, and wherein the cage is angled with respect to the circuit board.

13. The optical module of claim 1, wherein the cage is further configured to secure a CXP-compliant optical transceiver.

14. The optical module of claim 1, wherein the force required to insert the optical transceiver into the cage is within a range of about 4 lbf to about 15 lbf.

15. The optical module of claim 1, wherein the compressible gap pad includes at least one material from a group consisting of Laird HR 1200, Bergquist 3000S30, Bergquist 5000S35, thermally conductive tape, and phase change material.

16. The optical module of claim 1, further including:
    a finger stock coupled to the cage and configured to reduce electromagnetic interference.

17. The optical module of claim 1, wherein the apparatus is configured to be connected to an optical fiber.

18. A method of removing heat from an optical transceiver, the method comprising:
    securing an optical transceiver in an inserted state;
    maintaining a conduction surface in thermal contact with a surface of the optical transceiver in the inserted state;
    conducting heat away from the optical transceiver with a compressible gap pad in thermal contact with the conduction surface and a heat pipe; and
    removing heat, conducted by the heat pipe via the gap pad, using a heat sink in thermal contact with the heat pipe.

19. The method of claim 18, wherein securing the optical transceiver in the inserted state includes securing the optical transceiver in a cage.

20. The method of claim 19, wherein the optical transceiver is a CXP-compliant optical transceiver.

21. The method of claim 19, further including:
    attaching the cage and heat sink to a circuit board for pressing, routing or amplifying optical signals.

22. The method of claim 21, further including:
    disposing the heat sink along an edge of the circuit board, the heat pipe spanning from the gap pad to the edge of the module.

23. The method of claim 19, further including:
    coupling a finger stock to the cage, the finger stock configured to reduce electromagnetic interference.

24. The method of claim 19, wherein the conduction surface is a surface of a heat spreader, and further including:
    securing the heat spreader to the cage.

25. The method of claim 24, further including:
    bonding the compressible gap pad to the heat spreader with an adhesive.

26. The method of claim 24, wherein the heat spreader includes aluminum.

27. The method of claim 24, wherein securing the heat spreader to the cage includes projecting at least a portion of the conduction surface through an aperture in the cage.

28. The method of claim 27, wherein securing the heat spreading to the cage further includes using a spring clip to secure the heat spreader to the cage in a first flexible manner in an axis perpendicular to the aperture in the cage and in a second flexible manner in an axis parallel to the cage, the first flexible manner being more flexible than the second flexible manner, being up to or including rigid.

29. The method of claim 27, further including:
    positioning the heat spreader in thermal contact with the optical transceiver responsive to contact by a leading edge of the optical transceiver during insertion of the optical transceiver into the cage to.

30. The method of claim 18, further including:
    positioning the compressible gap pad to expand upon removal of the optical transceiver from the cage.

31. The method of claim 18, further including:
    inserting the optical transceiver into the cage with an insertion force within a range of about 4 lbf to about 15 lbf.

32. The method of claim 18, further including:
    coating the conduction surface at least partially with a non-stick coating.

33. An apparatus for removing heat from an optical transceiver, the method comprising:
- means for securing an optical transceiver in an inserted state;
- means for maintaining a conduction surface in thermal contact with a surface of the optical transceiver in the inserted state;
- compressible means for conducting heat away from the optical transceiver via the conduction surface to a heat pipe; and
- means for removing heat, conducted by the heat pipe via the gap pad, using a heat sink in thermal contact with the heat pipe.

* * * * *